United States Patent
Kurokawa et al.

(10) Patent No.: US 8,179,098 B2
(45) Date of Patent: May 15, 2012

(54) CHARGE CONTROLLING SEMICONDUCTOR INTEGRATED CIRCUIT

(75) Inventors: Gentaro Kurokawa, Atsugi (JP); Yoshihiro Takahashi, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 445 days.

(21) Appl. No.: 12/551,781

(22) Filed: Sep. 1, 2009

(65) Prior Publication Data

US 2010/0060244 A1 Mar. 11, 2010

(30) Foreign Application Priority Data

Sep. 11, 2008 (JP) .................................. 2008-233110

(51) Int. Cl.
*H02J 7/00* (2006.01)
*H02J 7/06* (2006.01)
*H02M 3/06* (2006.01)

(52) U.S. Cl. ........ 320/134; 320/103; 320/114; 320/136; 320/140; 320/163; 320/166; 307/46; 307/64; 307/66; 307/109

(58) Field of Classification Search .................. 320/103, 320/114, 134, 136, 140, 163, 166; 307/46, 307/64, 66, 109
See application file for complete search history.

(56) References Cited

U.S. PATENT DOCUMENTS

| | | | | | |
|---|---|---|---|---|---|
| 5,808,446 | A | * | 9/1998 | Eguchi | 320/134 |
| 6,246,214 | B1 | * | 6/2001 | Oglesbee | 320/136 |
| 6,812,673 | B2 | * | 11/2004 | Fujiwara | 320/136 |
| 7,391,184 | B2 | * | 6/2008 | Luo et al. | 320/137 |
| 2007/0194759 | A1 | * | 8/2007 | Shimizu et al. | 320/166 |

FOREIGN PATENT DOCUMENTS

JP 06-006142 A 1/1994

\* cited by examiner

*Primary Examiner* — Patrick Assouad
*Assistant Examiner* — Steve T Chung
(74) *Attorney, Agent, or Firm* — Holtz, Holtz, Goodman & Chick, PC

(57) ABSTRACT

Disclosed is a charge controlling semiconductor integrated circuit including: an electric current controlling transistor connected between a voltage input terminal and an output terminal to control an electric current which flows from the voltage input terminal to the output terminal; a power source monitoring circuit to detect status of input voltage of the voltage input terminal; and a transistor element connected between the voltage input terminal and a ground potential point, wherein a bypass capacitor is connected to the voltage input terminal; and the transistor element is turned on and the bypass capacitor discharges when the power source monitoring circuit detects the input voltage of the voltage input terminal is cut off.

6 Claims, 4 Drawing Sheets

CHARGE CONTROLLING SEMICONDUCTOR INTEGRATED CIRCUIT

BACKGROUND OF THE INVENTION

1. Field of the Invention

The present invention relates to a charge controlling semiconductor integrated circuit of a secondary battery, and in particular, an IC (semiconductor integrated circuit) for charge control including a function of discharging electric charge of a bypass capacitor when power is off.

2. Description of Related Art

A charging apparatus of a secondary battery uses an IC mounted with a charge control circuit for controlling charging current with a transistor for controlling electric current including a metal oxide semiconductor field effect transistor (MOSFET, insulated gate field effect transistor, hereinafter referred to as MOS transistor) provided between an input terminal where direct current voltage is provided from a direct current power source such as an AC adaptor and an output terminal connected to the secondary battery.

In an IC for charge control, since direct current voltage input to the IC for charging is the power source voltage of an internal current of the IC, a bypass capacitor is provided between the voltage input terminal and ground point in an outer section of the chip to prevent malfunction of the internal current caused by noise coming into the input voltage.

In a charging apparatus of the secondary battery shown in FIG. 3A including a bypass capacitor when the AC adaptor is removed, as shown in FIG. 3B, the charge remaining in the bypass capacitor is supplied from the voltage input terminal to the internal circuit of the charge control IC and malfunction of the internal circuit occurs. For example, when a lighting driving circuit of the LED (light emitting diode) is internally included, there is a possibility that an undesired situation occurs where it is clear from the outside that a malfunction of the internal circuit occurred, for example the LED is lighted even when the power is off.

Especially when the capacity of the bypass capacitor is large or the electrical current consumption of the IC is small, as shown in FIG. 4A, since the time T1 for the charge remaining in the bypass capacitor to discharge is long, there is a problem that the span in which there is a possibility that the internal circuit malfunctions is long.

Incidentally, as a technique to discharge electric charge of the bypass capacitor when the power is off, there is a technique disclosed in, for example, Japanese Patent Application Laid-Open Publication No. H6-6142. However, in such technique, discharge of the bypass capacitor connected to the output terminal is performed in order to synchronize the falling edge time of the output voltage, and the purpose of the technique is different from that of the present invention.

SUMMARY OF THE INVENTION

It is, therefore, an object of the present invention to prevent malfunction of the inner circuit when the power is off even when the bypass capacitor is connected to the voltage input terminal in an IC for charge control.

Another object of the present invention is to prevent malfunction of an inner circuit when the power is off basically without increasing the circuit in an IC for charge control.

According to an aspect of the present invention, there is provided a charge controlling semiconductor integrated circuit, including:

an electric current controlling transistor connected between a voltage input terminal and an output terminal to control an electric current which flows from the voltage input terminal to the output terminal;

a power source monitoring circuit to detect status of input voltage of the voltage input terminal; and a transistor element connected between the voltage input terminal and a ground potential point, wherein a bypass capacitor is connected to the voltage input terminal; and the transistor element is turned on and the bypass capacitor discharges when the power source monitoring circuit detects the input voltage of the voltage input terminal is cut off.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, wherein.

DESCRIPTION OF THE PREFERRED EMBODIMENTS

The best mode for carrying out the present invention will be explained in detail with reference to the drawings. However, the scope of the invention is not limited by the illustrated examples.

Figure 1:
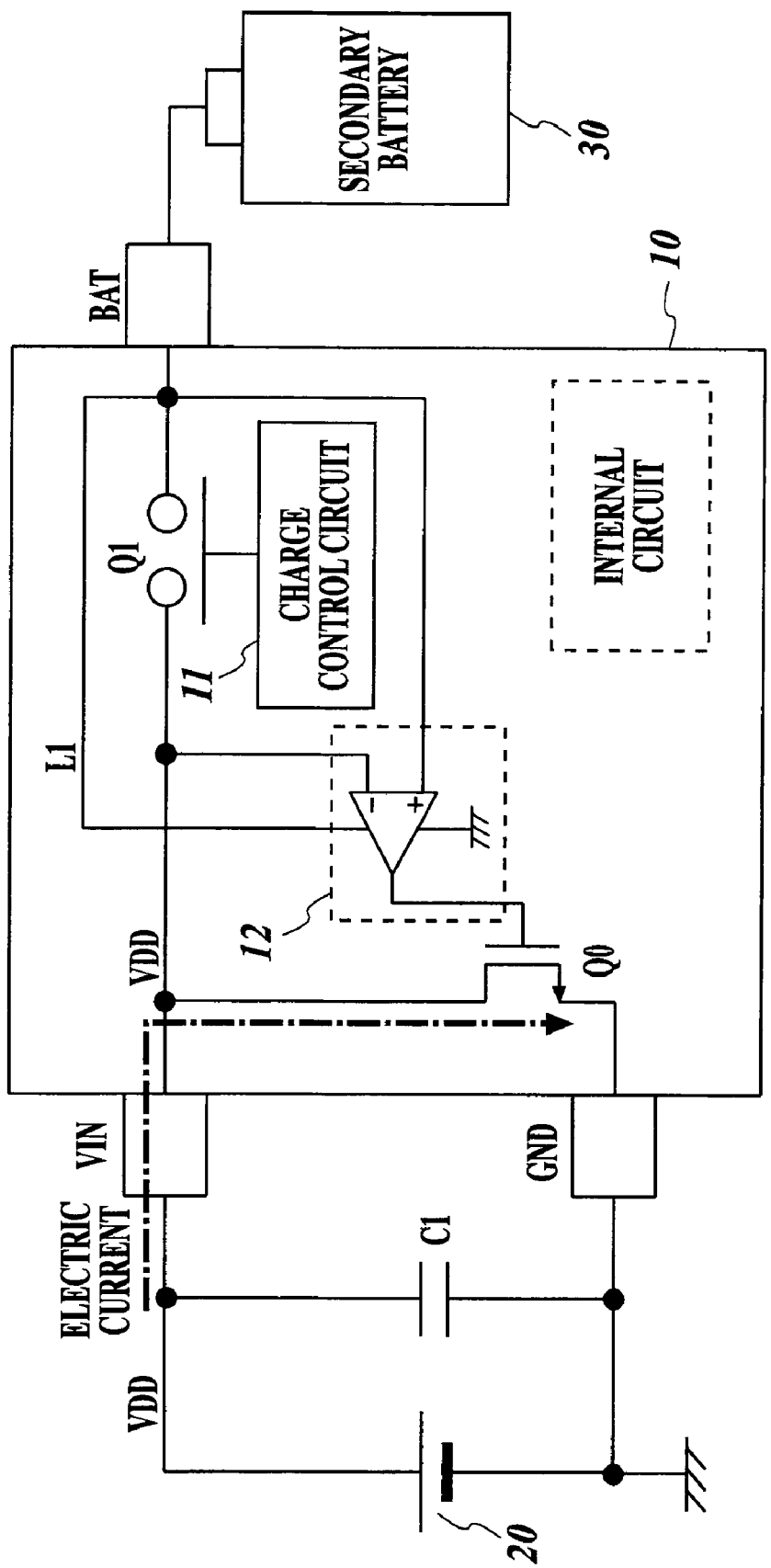
FIG. 1 is a diagram of a circuit structure showing an example of a structure of a charge control IC of a first embodiment of the present invention and a charging apparatus including the charge control IC.

FIG. 1 is a schematic structure of a first embodiment of an IC for charge control of a second battery applying the present invention and a charging apparatus which uses the IC.

As shown in FIG. 1, the charging apparatus of the present embodiment includes a direct current power source 20 such as an AC adaptor to convert alternating current voltage AC to direct current voltage DC and a charge control IC 10 for charging a secondary battery 30 such as a lithium ion battery with a direct current voltage VDD (for example 5V) supplied from the direct current power source 20.

The charge control IC 10 includes a voltage input terminal VIN where a direct current voltage VDD is input from the direct current power source 20 and a battery terminal BAT as an output terminal where a secondary battery 30 which is the object of charging is connected. A bypass capacitor C1 is connected between the voltage input terminal VIN and the ground point outside the chip. Also, inside the charge control IC 10, an N channel MOS transistor Q0 for protection from static electricity connected between the voltage input terminal VIN and the ground point is provided as a measure against electrostatic discharge.

Further, the charge control IC 10 includes an electric current control transistor element Q1 including a P channel MOSFET provided between the voltage input terminal VIN and the battery terminal BAT, a charge control circuit 11 which generates the control voltage of Q1, and a power source monitoring circuit 12 including a voltage comparison circuit (comparator) to compare the input voltage VDD and voltage VBAT of the battery terminal BAT to detect which voltage is higher.

In the present embodiment, the output of the power source monitoring circuit 12 is input to the charge control circuit 11 and the output is applied to the gate terminal of the MOS transistor Q0 for protection from static electricity. As a method for controlling the electric current control transistor element Q1 with the charge control circuit 11, there are various modes such as constant current charge, constant voltage charge and combinations thereof, however, the present invention is not directly associated with the control method and thus the detailed description is omitted.

The output of the power source monitoring circuit 12 is at low level (ground potential) during normal operation where direct current voltage VDD from the direct current power source 20 is input to the voltage input terminal VIN and charging of the secondary battery is performed. With this, the MOS transistor Q0 for protection from static electricity is in an off state, and the Q0 can function similar to the ESD element where in a normal IC the gate and the source are connected to operate as a diode.

Then, when the AC adaptor is removed, etc. and the direct current voltage VDD from the direct current power source 20 is not input to the voltage input terminal VIN, the charge of the bypass capacitor C1 flows to the internal circuit and the voltage of the input terminal VIN gradually decreases. Therefore, the voltage VBAT of the output terminal BAT becomes relatively higher than the voltage of the input terminal VIN and with this, the output of the power source monitoring circuit 12 changes to high level.

Figure 4A:
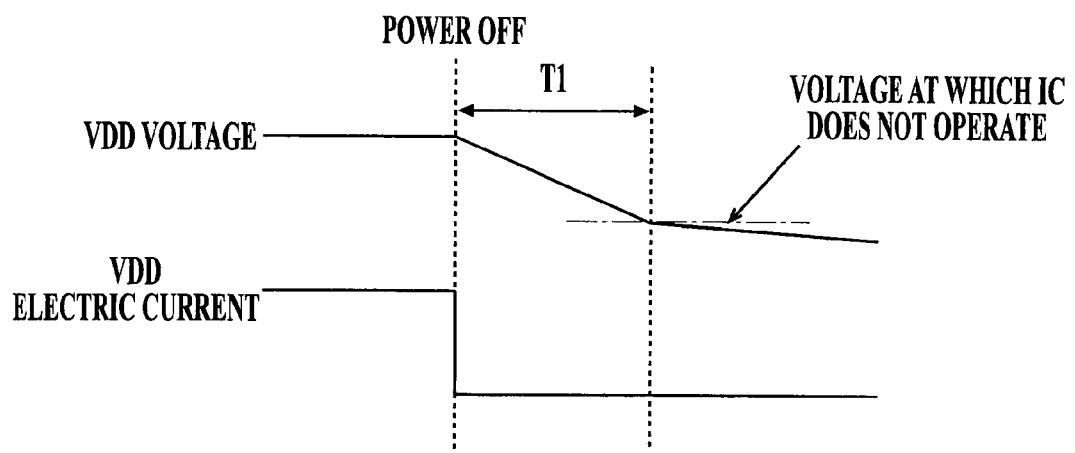
FIG. 4A is a time chart showing a status of change of input voltage when power is cut off in a conventional charge control IC.
Figure 4B:
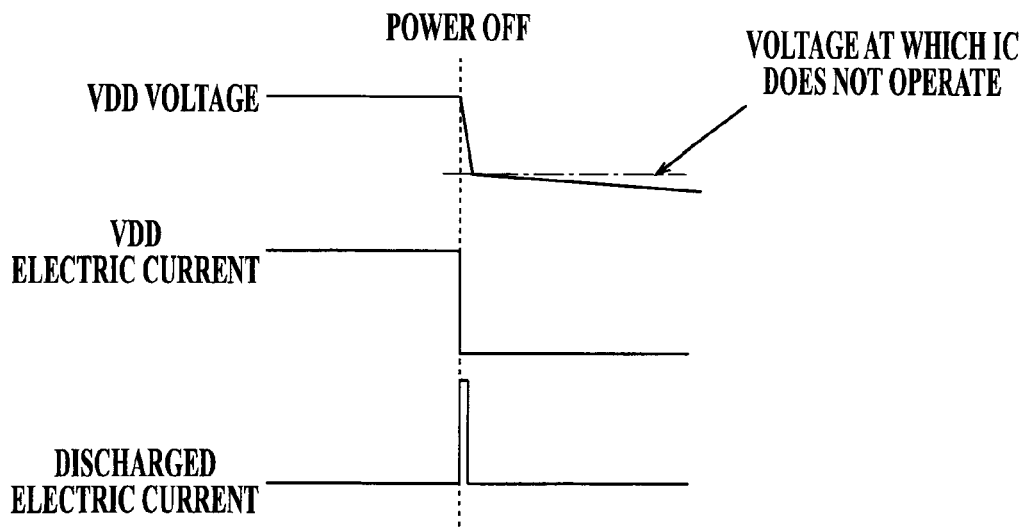
FIG. 4B is a time chart showing a status of change of input voltage when power is cut off in a charge control IC of the present invention.

Then, the electric current control transistor element Q1 is turned off by the charge control circuit 11 to prevent backflow and the MOS transistor Q0 for protection from static electricity is turned on to immediately discharge electric charge charged in the bypass capacitor C1. As a result, the discharge of the secondary battery 30 is prevented and also as shown in FIG. 4B, due to the discharge, the input voltage VDD rapidly falls and power source voltage is not supplied to the LED lighting driving circuit and other internal circuits and thus malfunction of the internal circuit can be prevented.

Incidentally, it is preferable that a power source line L1 as shown in FIG. 1 is provided so that power source voltage of the power source monitoring circuit 12 is supplied from the output terminal OUT in order to secure the operation of the power source monitoring circuit 12 for a while even when the electric current control transistor element Q1 is turned off.

In the present embodiment, the discharge of the bypass capacitor C1 to prevent malfunction of the inner circuit when the power is turned off is performed by using the transistor for protection from static electricity and the power source monitoring circuit 12 also functions as a backflow detecting circuit. Thus, when the power source monitoring circuit 12 to prevent backflow is already included, this backflow preventing circuit can serve multipurpose uses. Consequently, the discharge function of the bypass capacitor C1 can be realized basically without increasing circuits.

Further, in the charge control IC of the present embodiment, the supply of power to the internal circuit immediately stops when the power is turned off. This is similar to the function of a reset circuit. Therefore, a design where a reset circuit and an external terminal to receive an input of a reset signal from outside are not provided in the IC is possible and the number of terminals (pins) of the IC can be decreased. Consequently, the cost can be reduced.

Incidentally, as the internal circuit, other than the previously mentioned LED lighting driving circuit, overvoltage protection circuit, overcurrent protection circuit, electric flow control circuit to control the transistor Q1 for electric current control to charge the secondary battery with a constant current, a circuit to output a signal generated to control the AC adaptor to charge the secondary battery with a constant voltage, a mode control circuit to switch charging mode according to the voltage of the output terminal BAT, a timer circuit and the like are possible. The present embodiment can be applied to the charge control IC including the above internal circuit.

Figure 2:
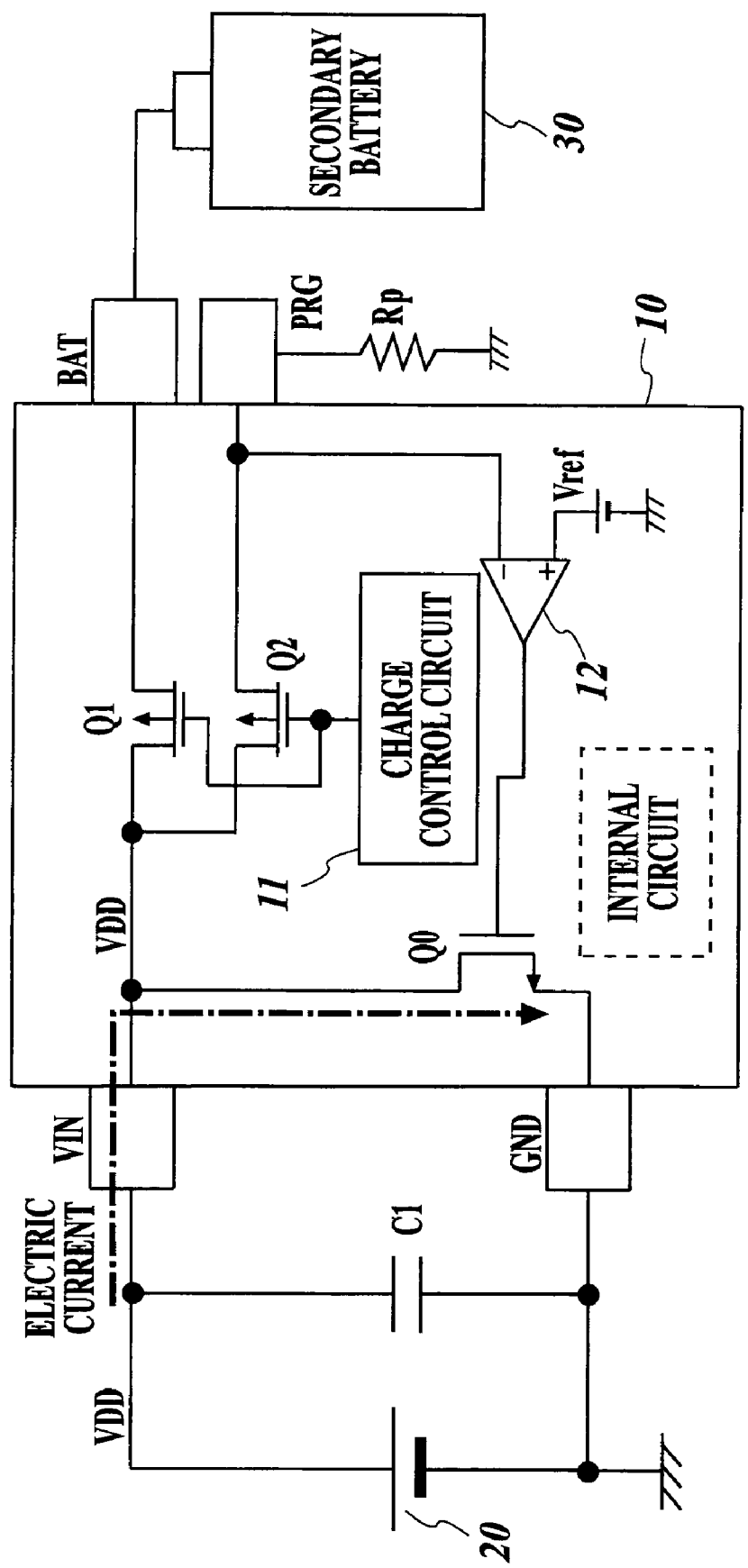
FIG. 2 is a diagram of a circuit structure showing an example of a structure of a charge control IC of a second embodiment of the present invention and a charging apparatus including the charge control IC.
Figure 3A:
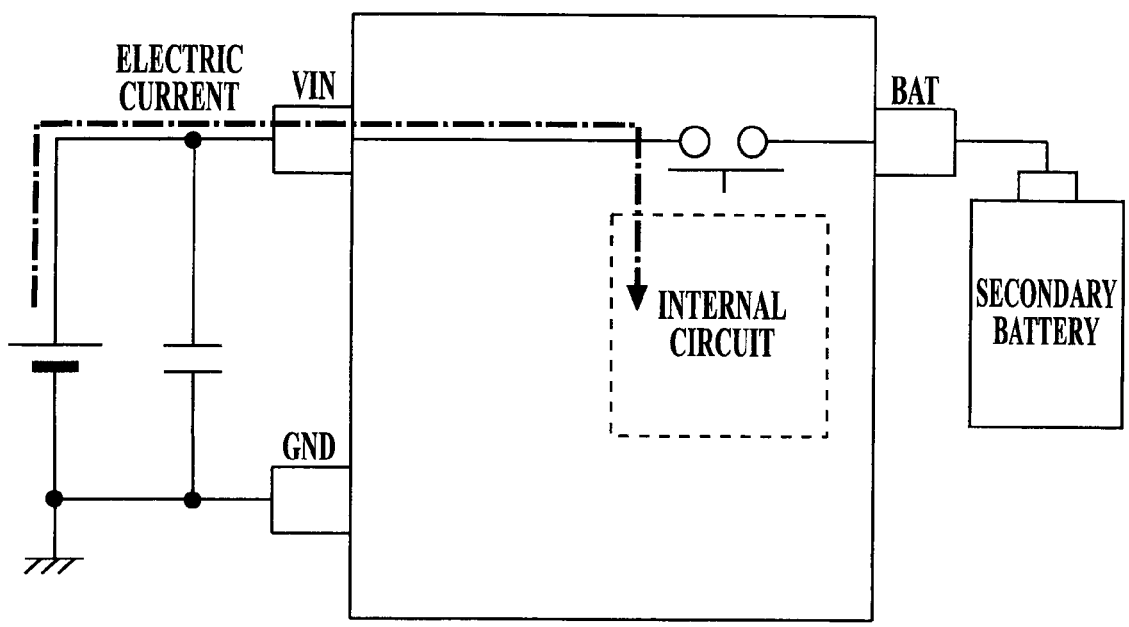
FIG. 3A is an explanatory diagram showing a status of normal charging operation in a conventional charge control IC.
Figure 3B:
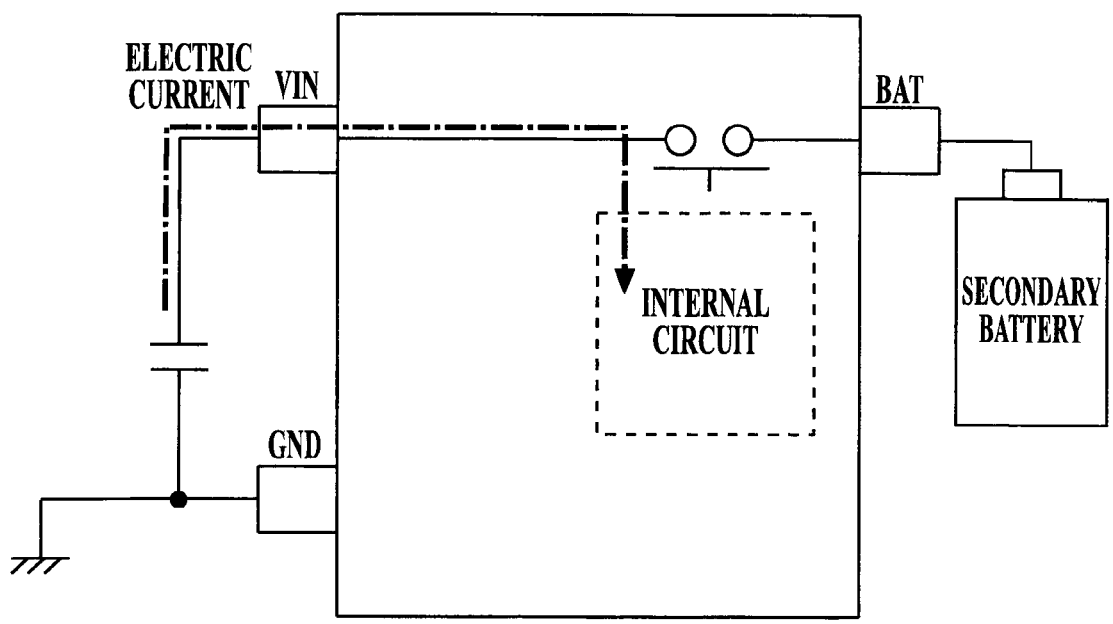
FIG. 3B is an explanatory diagram showing a status of when power is cut off in a conventional charge control IC.

FIG. 2 shows the second embodiment of the IC for charge control of a secondary battery applying the present invention.

The charge control IC 10 of the present embodiment uses a P channel MOS transistor as an electric current controlling transistor element Q1 provided between the voltage input terminal VIN and the battery terminal BAT, and also includes a monitoring MOS transistor Q2 with a size 1/N of the electric current controlling MOS transistor Q1 and an external terminal PRG connected to the drain terminal of the Q2.

A resistor Rp for current to voltage conversion is connected between the external terminal PRG and the ground point to convert the drain electric current of the transistor Q2 to voltage. In the monitoring MOS transistor Q2, the source terminal is connected to the voltage input terminal VIN and voltage same as that of the Q1 is applied to the control terminal (gate terminal) so that the MOS transistor Q2 and the electric current control MOS transistor Q1 structure a current mirror circuit. With this, a drain flow with a size of 1/N of the drain flow of the Q1 flows in the Q2 and then to the resistor Rp.

Therefore, the status of voltage between the voltage input terminal VIN and the battery terminal BAT can be obtained by converting the drain electric current of the Q2 to voltage with the resistor Rp and monitoring the voltage. Further, setting the size ratio between the Q2 and Q1 to, for example 1:500, enables a circuit where the increase of area and electric current due to providing the Q2 is made very small.

Further, in the charge control IC 10 of the present embodiment, the power source monitoring circuit 12 including a voltage comparison circuit (comparator) is provided to compare the voltage of the terminal PRG and the reference voltage Vref to detect which voltage is higher. The output voltage of the power source monitoring circuit 12 is applied to the charge control circuit 11 and the gate terminal of the MOS transistor Q0 for protection from static electricity, similar to the first embodiment.

In the present embodiment, when the supply of the input voltage VDD to the voltage input terminal VIN is cut off, the electric current flows from the bypass capacitor C1 to the internal circuit and the voltage of the voltage input terminal VIN gradually decreases. When the voltage of the voltage input terminal VIN becomes lower than the voltage of the output terminal BAT, electric current in the reverse direction flows to the electric current controlling MOS transistor Q1 and the drain voltage of the monitoring transistor Q2 with current mirror connection to the Q1 decreases.

Therefore, the output of the power source monitoring circuit 12 changes to high level, and the electric flow control transistor element Q1 is turned off by the charge control circuit 11 and the backflow is prevented. Also, the MOS transistor Q0 for protection from static electricity is turned on and the electric charge charged in the bypass capacitor C1 is discharged. As a result, the discharge of the secondary battery 30 is prevented and the power source voltage is not supplied to other internal circuits such as the LED lighting driving circuit and the malfunction of the internal circuit can be prevented.

Although not shown, in the present embodiment also, it is preferable that the power source voltage of the power source monitoring circuit 12 is supplied from the output terminal BAT in order to secure operation of the power source monitoring circuit 12 for a while after the electric current control transistor element Q1 is turned off.

Although embodiments of the present invention have been described above, the present invention is not limited to the above described embodiments. For example, in the embodiment shown in FIG. 2, the resistor Rp, which is for current to voltage conversion connected in a series with the monitoring MOS transistor Q2 which structures a current mirror with the electric current controlling MOS transistor Q1, is an external element of the IC, however, a resistor on the chip can be used. In this case, the voltages of both terminals of the resistor can be input to the voltage comparison circuit as the power source monitoring circuit 12 and the backflow state can be detected.

Also, instead of providing the monitoring MOS transistor Q2 and the resistor Rp, the resistor can be provided in a series with the electric current control MOS transistor Q1 and the backflow status can be detected from the voltage between the terminals. Further, in the present embodiment, an MOS transistor is used as the electric current control transistor Q1, however, a bipolar transistor can be used.

Further, in the present embodiment, the ESD element originally provided is used as a switch element to discharge the electric charge of the bypass capacitor C1, however, the switch element can be provided separate from the ESD element. Also, in FIG. 1 and FIG. 2, only the transistor Q0 for protection from static electricity is connected between the voltage input terminal VIN and the ground point, however, a structure where a resistor is connected in series with the Q0 is also possible.

In the above described description, an example of applying the present invention in an IC for charge control of a secondary battery is described. However, the present invention is not limited to this example and can be used in an IC for power source control of a direct current power source circuit such as a series regulator.

According to an aspect of the preferred embodiments of the present invention there is provided a charge controlling semiconductor integrated circuit including:

an electric current controlling transistor connected between a voltage input terminal and an output terminal to control an electric current which flows from the voltage input terminal to the output terminal;

a power source monitoring circuit to detect status of input voltage of the voltage input terminal; and a transistor element connected between the voltage input terminal and a ground potential point, wherein a bypass capacitor is connected to the voltage input terminal; and the transistor element is turned on and the bypass capacitor discharges when the power source monitoring circuit detects the input voltage of the voltage input terminal is cut off.

According to the above aspect, when the input voltage is cut off, the bypass capacitor connected to the voltage input terminal is immediately discharged, and the charged electric charge of the bypass capacitor flows in the internal circuit so that malfunction of the internal circuit can be prevented.

Preferably, in the charge controlling semiconductor integrated circuit, the transistor element is a field effect transistor for protection from static electricity; and the output of the power source monitoring circuit is applied to the gate terminal of the transistor.

Consequently, the element for protection from static electricity can also be used as the switch element for discharge of the bypass capacitor when input voltage is cut off, and the increase of chip size due to additional circuits to prevent malfunction of the internal circuit can be suppressed.

Preferably, in the charge controlling semiconductor integrated circuit, the electric current controlling transistor is turned off when the power source monitoring circuit detects the input voltage of the voltage input terminal is cut off.

Consequently, in a charge controlling semiconductor integrated circuit where it is desired to control the IC so that the electric current control transistor is turned off when backflow is detected, a monitoring circuit to detect backflow can also function as an input power source monitoring circuit for discharge of the bypass capacitor when input voltage is cut off, and the increase of chip size due to additional circuits to prevent malfunction of the internal circuit can be suppressed.

Preferably, in the charge controlling semiconductor integrated circuit, the power source monitoring circuit includes a voltage comparison circuit which receives voltage of the voltage input terminal and voltage of the output terminal as input; and the power source monitoring circuit turns the transistor element on when the voltage comparison circuit detects a status of an output voltage being higher.

Consequently, the design of the power source monitoring circuit can be performed very easily.

Preferably, the charge controlling semiconductor integrated circuit further includes:

a monitoring transistor which constitutes a current mirror circuit with the electric current controlling transistor; and a resistor element connected in a series with the monitoring transistor, wherein the power source monitoring circuit includes a voltage comparison circuit which receives voltage subjected to a current to voltage conversion by the resistor element and a predetermined reference voltage as input; and the voltage comparison circuit turns the transistor element on when the voltage subjected to the current to voltage conversion by the resistor element becomes lower than the predetermined reference voltage.

Consequently, the voltage status of the voltage input terminal can be detected without influencing the bias status of the electric current controlling transistor and the bypass capacitor can be discharged when the input voltage is cut off while securing highly accurate charge control.

Preferably, in the charge controlling semiconductor integrated circuit, the power source monitoring circuit operates with voltage of the output terminal as power source voltage.

Consequently, the operation of the power source monitoring circuit can be secured even when the input voltage is cut off and the discharge of the bypass capacitor can be reliably performed.

According to the above aspects, in an IC for charge control, even when a bypass capacitor is connected to the voltage internal terminal, malfunction of the internal circuit when the power is turned off can be prevented. Further, an advantageous effect of preventing the malfunction of the internal circuit basically without increasing the circuit can be achieved.

The entire disclosure of Japanese Patent Application No. 2008-233110 filed on Sep. 11, 2008 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A charge controlling semiconductor integrated: circuit comprising:
    an electric current controlling transistor connected between a voltage input terminal and an output terminal to control an electric current which flows from the voltage input terminal to the output terminal;
    a power source monitoring circuit to detect status of input voltage of the voltage input terminal; and
    a transistor element connected between the voltage input terminal and a ground potential point, wherein
    a bypass capacitor is connected to the voltage input terminal; and
    the transistor element is turned on and the bypass capacitor discharges when the power source monitoring circuit detects the input voltage of the voltage input terminal is cut off.

2. The charge controlling semiconductor integrated circuit according to claim 1, wherein
    the transistor element is a field effect transistor for protection from static electricity; and
    the output of the power source monitoring circuit is applied to the gate terminal of the transistor.

3. The charge controlling semiconductor integrated circuit according to claim 1, wherein the electric current controlling transistor is turned off when the power source monitoring circuit detects the input voltage of the voltage input terminal is cut off.

4. The charge controlling semiconductor integrated circuit according to claim 1, wherein
    the power source monitoring circuit includes a voltage comparison circuit which receives voltage of the voltage input terminal and voltage of the output terminal as input; and
    the power source monitoring circuit turns the transistor element on when the voltage comparison circuit detects a status of an output voltage being higher.

5. The charge controlling semiconductor integrated circuit according to claim 1, further comprising:
    a monitoring transistor which constitutes a current mirror circuit with the electric current controlling transistor; and
    a resistor element connected in a series with the monitoring transistor, wherein
    the power source monitoring circuit includes a voltage comparison circuit which receives voltage subjected to a current to voltage conversion by the resistor element and a predetermined reference voltage as input; and
    the voltage comparison circuit turns the transistor element on when the voltage subjected to the current to voltage conversion by the resistor element becomes lower than the predetermined reference voltage.

6. The charge controlling semiconductor integrated circuit according to claim 1, wherein the power source monitoring circuit operates with voltage of the output terminal as power source voltage.

* * * * *